United States Patent [19]

Jackson, Jr. et al.

[11] 4,238,600

[45] Dec. 9, 1980

[54] COPOLYESTERS DERIVED FROM TEREPHTHALIC ACID, PHENYLHYDROQUINONE AND T-BUTYLHYDROQUINONE

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 95,852

[22] Filed: Nov. 19, 1979

[51] Int. Cl.$^3$ ............................................. C08G 63/18
[52] U.S. Cl. ..................................... 528/193; 528/190; 528/191; 528/194; 528/271; 528/309
[58] Field of Search ............... 528/193, 194, 190, 191, 528/271, 309

[56] References Cited

U.S. PATENT DOCUMENTS

| | | | |
|---|---|---|---|
| 3,160,602 | 12/1964 | Kantor | 528/193 |
| 3,991,013 | 11/1976 | Pletcher | 528/193 |
| 3,991,014 | 11/1976 | Kleinschuster | 528/193 |
| 4,064,108 | 12/1977 | Inata et al. | 528/193 |
| 4,066,620 | 1/1978 | Kleinschuster et al. | 528/193 |
| 4,118,372 | 10/1978 | Schaefgen | 528/193 |
| 4,153,779 | 5/1979 | Jackson, Jr. et al. | 528/193 |
| 4,156,070 | 5/1979 | Jackson, Jr. et al. | 528/193 |
| 4,159,365 | 6/1979 | Payet | 528/176 |

*Primary Examiner*—Lester L. Lee
*Attorney, Agent, or Firm*—William P. Heath, Jr.; Daniel B. Reece, III

[57] ABSTRACT

Copolyesters of terephthalic acid, phenylhydroquinone and 25 to 65 mole percent t-butylhydroquinone based on total moles of diol. These copolyesters are characterized by high melting points, good melt processability, high heat resistance and high oxidative stability. The copolyesters are useful for the manufacture of melt-spun fibers, extruded films and injection molded articles.

4 Claims, No Drawings

COPOLYESTERS DERIVED FROM TEREPHTHALIC ACID, PHENYLHYDROQUINONE AND T-BUTYLHYDROQUINONE

DESCRIPTION

1. Technical Field

Our invention is a class of novel copolyesters derived from terephthalic acid, phenylhydroquinone and about 25 to 65 mole percent of t-butylhydroquinone based on the total amount of phenylhydroquinone and t-butylhydroquinone.

We have discovered that the crystalline melting point of our copolymer is increased by modification with t-butylhydroquinone instead of being decreased as compared to the homopolymer of terephthalic acid and phenylhydroquinone. The copolyesters have good melt processability, high heat resistance and high oxidative stability.

2. Background Art

U.S. Pat. No. 4,159,365 discloses copolymesters of terephthalic acid and phenylhydroquinone containing up to 10 mole percent (based on total moles of units) of other aromatic or cycloaliphatic polyester-forming units. Substituted hydroquinones are not disclosed in the above patent. Ten mole percent of the "other aromatic polyester-forming units", above, if an aromatic diol corresponds to twenty mole percent based on the total moles of aromatic diols combined. In column two, lines 29 and 30 of the '365 patent, it is stated that "the presence of comonomer units depresses the melting point as would be expected".

U.S. Pat. No. 3,160,602 discloses polyesters of terephthalic acid and phenylhydroquinone.

DISCLOSURE OF INVENTION

This invention is a class of novel copolyesters having a film- and fiber-forming molecular weight and consisting essentially of the following divalent radicals

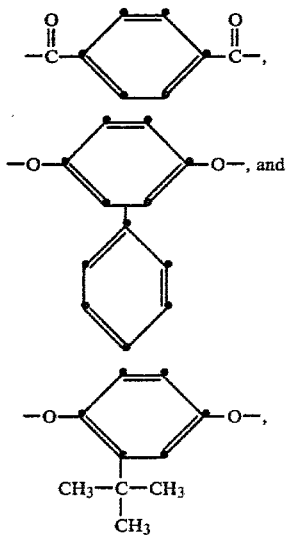

wherein (C) is present in the amount of about 25 to 65 mole percent based (B) and (C).

Shaped articles such as films, fibers, foamed plastics, extruded shapes and coatings may be fabricated from the copolymers of this invention. The compositions of this invention also may contain nucleating agents, pigments, glass fibers, asbestos fibers, antioxidants, stabilizers, plasticizers, lubricants and other additives.

The copolymers of the invention are made by conventional techniques, such as by acidolysis of phenylhyroquinone diacetate and t-butylhydroquinone diacetate with terephthalic acid. The reactants are heated at about 300° C. until most of the monocarboxylic acid has evolved. The temperature of the melt is then increased to about 350°–380° C., a vacuum of about 0.5 millimeter is applied, and stirring is continued until a high melt viscosity polymer is obtained. If the polymer solidifies, its molecular weight may be increased to a sufficient value by heating particles of the polymer in an inert atmosphere or under reduced pressure at a temperature just below the softening point of the polymer. The molecular weights are high enough to be fiber-forming. Tenacities greater than 10 g./den. can be obtained by heating melt-spun fibers in an inert atmosphere or under reduced pressure at 280°–330° C. for several hours.

The diacyl derivative of the t-butylhydroquinone used in this invention is made by known methods employing lower acylhalides or anhydrides containing 2 to 8 carbon atoms in the acyl group. The acetyl and propionyl derivatives are preferred but the butyryl, isobutyryl or benzoyl derivatives are examples of others which may also be used.

Up to 20 mole percent of aromatic dicarboxylic acids other than terephthalic acid may be used in the preparation of the copolymers of this invention provided the properties are not substantially altered. Examples of such acids are 2,6-naphthalenedicarboxylic acid, 4,4'-oxydibenzoic acid, monochloroterephthalic acid, dichloroterephthalic acid, methylterephthalic acid, dimethylterephthalic acid, 4,4'-diphenyldicarboxylic acid, isophthalic acid or methylisophthalic acid. Preferably terephthalic acid is the only acid used.

The copolymers of this invention exhibit melt processability, heat resistance and oxidative stability, and the copolymers of this invention have unexpectedly high melting points.

The following table shows the effect of various amounts of t-butylhydroquinone, clorohydroquinone and methylhydroquinone on the melting point of poly(-phenyl-1,4-phenylene terephthalate) copolyesters prepared in the melt. The melting points were determined with a Perkin-Elmer DSC-2 differential scanning calorimeter.

| Modifier, Mole Percent | Modified Polyester Melting Point, °C. | | |
| --- | --- | --- | --- |
| | t-Butyl-hydroquinone | Chloro-hydroquinone | Methyl-hydroquinone |
| 0 | 340 | 340 | 340 |
| 20 | 342 | 315 | 324 |
| 30 | 353[a] | 322 | 338 |
| 40 | 364 | 318 | 334 |
| 50 | 370 | 320 | 327 |
| 60 | 382 | 318 | 333 |

[a] 25 mole percent t-butylhydroquinone

As expected, the melting point of the homopolymer is depressed by chlorohydroquinone and methylhydroquinone. Therefore it was expected that t-butylhydroquinone would also lower the melting point of poly(phenylphenylene terephthalate). However we discovered that the melting points of the copolymers were higher than that of the homopolymer before modification.

In spite of the presence of the t-butyl alkyl group, the polymers of this invention have high oxidative stability and maintain their properties after extended heating periods in an oven at elevated temperatures.

The following example is submitted for a better understanding of the invention.

EXAMPLE

Inherent viscosities are determined at 25° C. in a 40/35/25 weight mixture of p-chlorophenol/tetrachloroethane/phenol at a concentration of 0.1 g./100 ml.

This example illustrates the preparation of a copolyester from terephthalic acid, 50 mole percent t-butylhydroquinone diacetate and 50 mole percent 2-phenylhydroquinone dipropionate. A mixture of 16.6 g. (0.10 mole) terephthalic acid, 12.6 g. (0.0505 mole) t-butylhydroquinone diacetate and 15.0 g. (0.0505 mole) phenylhydroquinone dipropionate is placed in a 100 ml. flask equipped with a stirrer, a short distillation column and an inlet for nitrogen. The flask is evacuated and purged three times with nitrogen before being lowered into a Wood's metal bath maintained at 140° C. The mixture is heated under a nitrogen atmosphere with stirring to a temperature of 295° C., at which point acetic and propionic acids begin to distill rapidly from the flask. After the reaction mixture is heated with stirring at this temperature for 90 minutes, the temperature of the bath is increased to 380° C. A vacuum of 0.5 millimeter of mercury is then applied over a period of 10 minutes. After stirring is continued under 0.5 millimeter of mercury at 380° C. for seven minutes, a medium melt viscosity, opaque, light tan polymer is obtained. The polymer has an inherent viscosity of 1.9 and a crystalline melting point at 370° C. An opaque film can be pressed easily at 380° C.

The invention has been described in detail with particular reference to certain preferred embodiments thereof, but it will be understood that variations and modifications can be effected within the spirit and scope of the invention.

We claim:

1. Copolyester having a film- and fiber-forming molecular weight and consisting essentially of the following divalent radicals

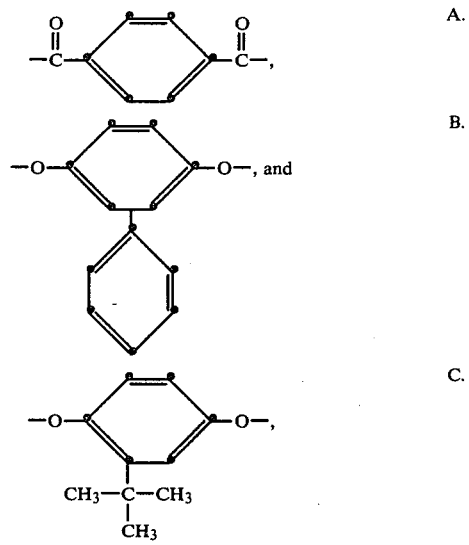

wherein (C) is present in the amount of about 25 to 65 mole percent based on (B) and (C).

2. Copolyester of claim 1, wherein (C) is present in the amount of about 30 to 50 mole percent.
3. Shaped article of the copolyester of claim 1.
4. Shaped article of the copolyester of claim 2.

* * * * *